United States Patent

[11] 3,575,636

| [72] | Inventors | Michel Edmond Etienne<br>Nantes;<br>Fernand F. Nouvion, Fontenay-le-Fleury<br>France |
|---|---|---|
| [21] | Appl. No. | 752,276 |
| [22] | Filed | Aug. 13, 1968 |
| [45] | Patented | Apr. 20, 1971 |
| [73] | Assignee | Etablissements Brissonneau et Lotz<br>Paris, France |
| [32] | Priority | Jan. 2, 1968 |
| [33] | | France |
| [31] | | 134,533 |

[54] PROTECTING DEVICE FOR ROTATING MACHINES
10 Claims, 6 Drawing Figs.

[52] U.S. Cl. .................................................. 317/13,
318/447
[51] Int. Cl. .................................................. H02h 7/06
[50] Field of Search .......................................... 317/13, 14,
14.9, (Inquired); 318/447 (Inquired)

[56] References Cited
UNITED STATES PATENTS

| 1,317,283 | 9/1919 | Ferris ........................... | 317/13 |
| 1,323,798 | 12/1919 | Tritle ........................... | 317/13X |
| 1,580,810 | 4/1926 | Burnham ...................... | 317/13 |
| 1,602,743 | 10/1926 | Benson ........................ | 317/13 |
| 1,867,417 | 7/1932 | Merrick ........................ | 317/13 |
| 2,246,816 | 6/1941 | Sandstrom .................... | 317/14(.9) |
| 2,468,743 | 5/1949 | Frost ........................... | 318/447 |
| 3,275,889 | 9/1966 | Sharp et al. .................. | 317/14 |

Primary Examiner—William M. Shoop, Jr.
Attorney—Oldham & Oldham

ABSTRACT: Device for protecting a rotating electric machine having a collector against short circuits. The device comprises a detector connected to the terminals of the armature or the assembly comprising the armature and the auxiliary poles of said machine, a filter for separating the damped electric oscillations from electric disturbances created by the elements of the machine, a level discriminator for producing a logic signal when the frequency of the damped oscillations exceeds a given value, and a circuit controlling the supply of said machine.

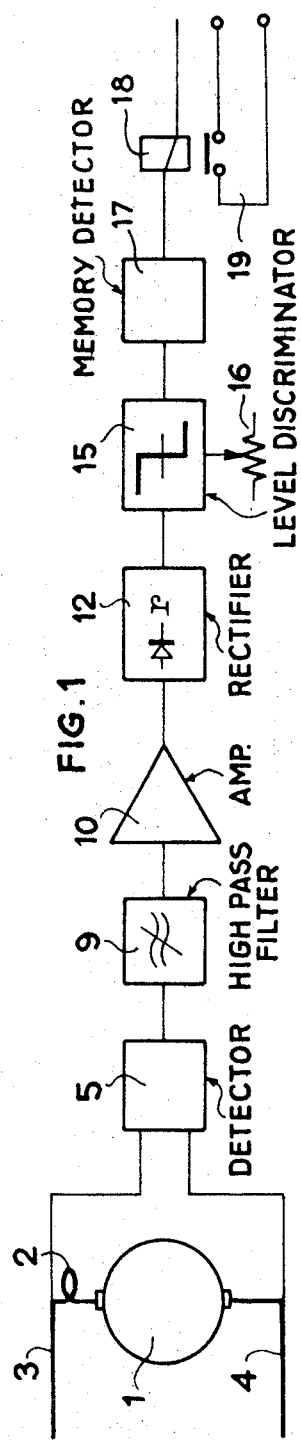
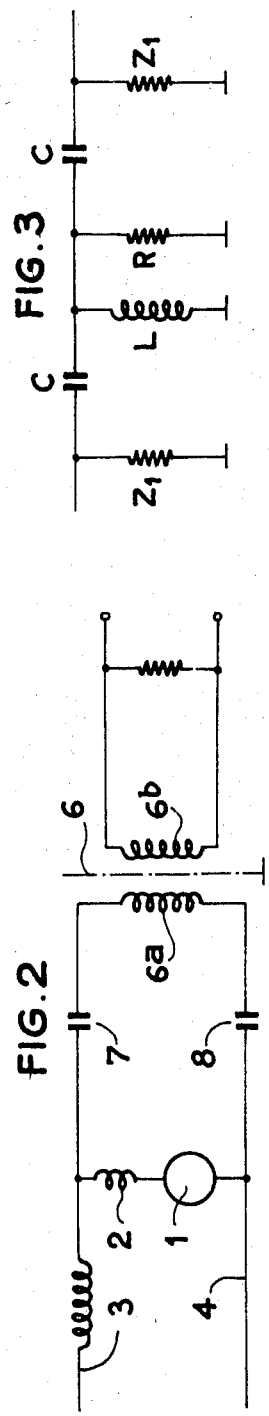
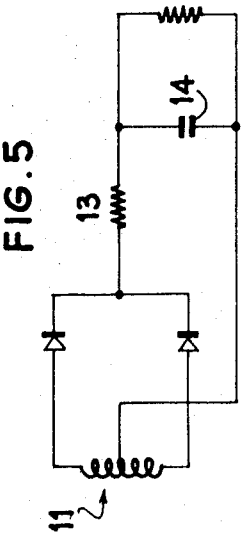
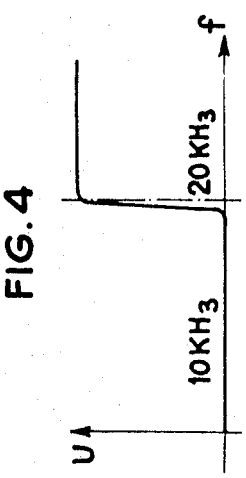

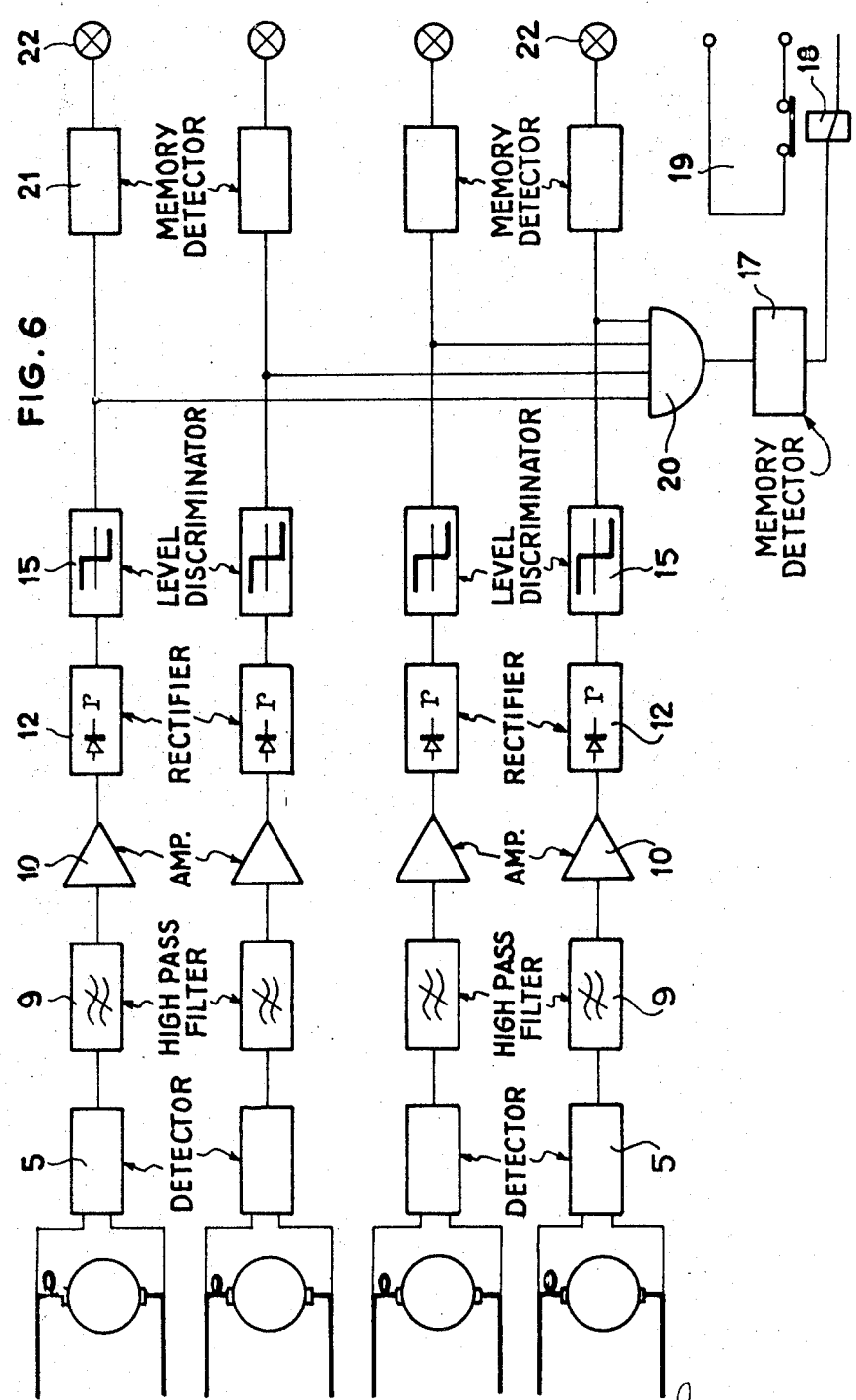

PROTECTING DEVICE FOR ROTATING MACHINES

The present invention relates to protecting devices for rotating machines and more particularly to a device for protecting against the formation of arcs or flashes on a collector of a DC machine.

The rotating machines having a collector employed in electric traction are sometimes subjected to disturbances which tend to deviate the current from its normal path and result in a spontaneous and often destructive short circuit between the brushes of said machines.

The causes of these disturbances are multiple and uncontrollable. On the other hand, these disturbances are usually preceded by electrical phenomena which are manifested in the form of damped electric oscillations whose amplitude varies but little but whose frequency of repetition substantially increases at the instants preceding the spontaneous short circuit.

The object of the invention is to preclude these short circuits by providing a protecting device for detecting these electric phenomena, evaluating the importance thereof and rapidly cutting off the main circuit of the rotating machines when the evaluated level exceeds a chosen limit.

The invention provides a device for protecting a rotating machine having a collector against spontaneous short circuits usually preceded by damped oscillations of the voltage at the terminals of the collector, said device comprising a detector connected to the terminals of the armature or the assembly comprising the armature and the auxiliary poles of said machine, a filter for separating the damped electric oscillations from electric disturbances created by the elements of the machine, a level discriminator for producing a logic signal when the frequency of the damped oscillations exceeds a given value, and a circuit controlling the supply of said machine.

Further features and advantages of the invention will be apparent from the ensuing description with reference to the accompanying drawings.

In the drawings:

FIG. 1 is a synoptical diagram of a device affording a protection against spontaneous short circuits according to the invention applied to a series-wound motor;

FIG. 2 is an electric diagram of the detector forming part of the device shown in FIG. 1;

FIG. 3 is an electric diagram of the filter for the damped oscillations;

FIG. 4 is the filtering characteristic of the filter shown in FIG. 3;

FIG. 5 is an electric diagram of the rectifying circuit of the device shown in FIG. 1, and FIG. 6 is a protecting installation according to the invention applied to four motors.

In FIG. 1 the invention is considered to be applied to a series-wound motor.

Connected to the terminals of the assembly comprising the armature of a motor 1 and its auxiliary winding 2 fed through conductors 3 and 4, is a detector 5 (FIG. 2) comprising a wide-band transformer 6 and two insulating capacitors 7 and 8 inserted at the two ends of the primary winding 6a of the transformer so as to prevent passage of direct current in the primary winding.

The output of the detector 5, consisting of the secondary winding 6b of the transformer 6, is connected to a high pass filter 9 (FIG. 3) consisting of a T-shaped network having a resistor R, a choke coil L and capacitors C and input and output impedances $Z_1$.

The filter 9, whose filtering characteristic is shown in FIG. 4, is adapted to allow through the signals whose frequency is higher than 20 kHz. (beyond which frequency the damped oscillations preceding the spontaneous short circuit of the motor can occur) and to stop parasitic signals of lower frequency produced by component parts of the motor such as the shunt commutator.

Connected to the output of the filter 9 is a feedback transistor amplifier 10 of conventional type, for example having an amplifying stage whose gain is adjustable by a potentiometer and a power stage. The load of the collector of the power stage is constituted for example by the primary winding of a transformer 11 which is part of a full-wave rectifying circuit 12 comprising a resistance-capacity circuit 13, 14 (FIG. 5). The resistance-capacity 13, 14 is so connected as to have a charging time constant which is one third of its discharging time constant, so that when the frequency of the signals increases, the mean value of the rectified voltage also increases.

Connected to the output of the rectifying circuit 12 is a level discriminator 15 whose threshold can be previously regulated by means of a potentiometer 16 acting on the polarization voltage of the discriminator.

Connected to the output of the discriminator 15 is a memory detector 17, for example consisting of a thyristor having a delayed cutoff control adapted to control a relay 18 whose contacts are inserted in a control and safety circuit 19 for the supply of the motor.

The relay 18 can also directly control the opening of the switch of the supply line of the motor 1.

In the installation shown in FIG. 6, each of the four motors 1 is provided with its own protecting device.

As in the case of the device shown in FIG. 1, each protecting device comprises a detector 5, a filter 9, an amplifier 10, a rectifier 12 and a level discriminator 15.

On the other hand, the memory detector 17 and the relay 18 are common to the four lines.

An OR circuit 20 having four inputs and one output is connected through its inputs to the four discriminators 15 and through its output to the memory detector 17. Further, the four protecting devices are each provided with an auxiliary memory detector 21 connected to the output of each discriminator 15 and adapted to control a small circuit breaker 22 giving a visual indication which is manually reloaded.

The protecting device shown in FIG. 1 operates in the following manner.

When the damped oscillations, indicating the imminence of a short circuit, appear at the terminals of the motor 1, they are separated from the DC supply in the detector 5 which is provided with insulating capacitors 7 and 8 for this purpose. The resulting alternating signal comprises damped oscillations to be treated and parasitic signals produced by the operating parts of the motor. This composite signal is applied to the high pass filter 9 whose cutoff frequency is 20 KHz. The thus filtered signal only comprises the damped oscillations and is amplified in the amplifier 10 and then rectified in the rectifier 12.

This voltage is applied to the level discriminator 15 whose threshold is previously regulated by the potentiometer 16 which acts on the polarization of the discriminator.

When the voltage applied thereto exceeds the predetermined threshold, that is to say, when the frequency of the damped oscillations has reached a critical value, the discriminator 15 produces a signal which triggers the memory detector 17 whose thyristor is in turn triggered and controls the relay 18. The latter opens the supply circuit of the motor 1 by means of the control and safety circuit 19.

The memory detector comprises a delayed cutoff control circuit which maintains it in its conductive state for, for example, 30 seconds. Then the detector 17 is cutoff and the relay 18, in returning to its position of rest, closes the supply circuit of the motor.

When damped oscillations having a critical frequency once more appear at the terminals of the motor, the protecting device once more opens its supply circuit.

In the installation shown in FIG. 6, one of the four inputs of the OR circuit 20 receives a logic signal from the discriminator 15 relating to the motor at the terminals of which the damped oscillations of critical frequency appear.

The OR circuit 20 transmits this logic signal to the memory detector 17 which opens, through the relay 18, for about 20 seconds the supply circuit of the four motors.

At the same time as the logic signal is applied to the memory detector 17, it is also transmitted to the corresponding memory detector 21 which controls the signal circuit breaker 22 having a manual reloading.

Thus, the user can ascertain which of the motors has or have started to short circuit and effect a cleaning or repairing operation.

In order to reduce the delay between the appearance of the oscillation signal and the closure of the relay 18, the coil of the latter is overloaded at a ratio of 3.

Although specific embodiments of the invention have been described, many modifications and changes may be made therein without departing from the scope of the invention as defined in the appended claims.

We claim:

1. A device for protecting a rotating machine having an inductor, an armature and a collector and brushes assembly, against short circuits between the brushes of said machine, said short circuits being preceded by damped oscillations of the voltage at the terminals of the armature of said machine, the repetition frequency of said damped oscillations increasing immediately before said short circuits, said device comprising a detector the input of which is connected to the terminals of the armature or the assembly comprising the armature and auxiliary poles of said machine, a filter the input of which is connected to the output of said detector for separating the damped electric oscillations from electric disturbances created by the elements of said machine, a level discriminator the input of which is connected to the output of said filter for producing a logic signal when the frequency of the damped oscillations exceeds a given value, and a control circuit connected to the output of said level discriminator for controlling the supply of said machine.

2. A device as claimed in claim 1, wherein the detector comprises a wide-band transformer having a primary winding and a secondary winding and an insulating capacitor for the DC current connected at each end of the primary winding of said transformer.

3. A device as claimed in claim 1, wherein said filter consists of a high pass T-shaped network having capacity branches.

4. A device as claimed in claim 1, comprising, inserted between said filter and said discriminator, an amplifier having an adjustable gain and a full-wave rectifier connected to a resistance-capacity circuit whose charging time constant is less than the discharging time constant.

5. A device as claimed in claim 1, wherein said level discriminator comprises a threshold regulating potentiometer.

6. A device as claimed in claim 1, wherein said circuit controlling the supply of the machine comprises a memory detector and a relay whose contacts are inserted in said control and safety circuit of the supply of the machine.

7. A device as claimed in claim 6, wherein the memory detector is a thyristor whose control electrode is connected to the output of the level discriminator and whose cutoff is ensured at the end of a given operational time by a delayed control circuit.

8. An installation for protecting a plurality of rotating machines having each an inductor, an armature and a collector and brushes assembly, against short circuits between the brushes of said machines, said short circuits being usually preceded by damped oscillations of the voltage at the terminals of the armatures of said machines, the repetition frequency of said oscillations increasing immediately before said short circuits, said installation comprising a plurality of protecting devices respectively combined with said machines, each device comprising a detector the input of which is connected to the terminals of the armature or the assembly comprising the armature and auxiliary poles of the corresponding machine, a filter the input of which is connected to the output of said detector for separating the damped electric oscillations from electric disturbances created by the elements of the corresponding machine, a level discriminator the input of which is connected to the output of said filter for producing a logic signal when the frequency of the damped oscillations occuring at the terminals of the armature of the corresponding machine exceeds a given value, and a control circuit connected to the output of said level discriminator for controlling the supply of the corresponding machine, said control circuit being common to all the machines.

9. An installation as claimed in claim 8, wherein the level discriminators relating to each machine are connected by their outputs to the inputs of an OR circuit whose output is connected to said common circuit controlling the supply.

10. An installation as claimed in claim 8, wherein each protecting device is provided with a memory circuit for indicating the machine or machines which have started to short circuit.

UNITED STATES PATENT OFFICE
CERTIFICATE OF CORRECTION

Patent No. 3,575,636              Dated    April 20, 1971

Inventor(s)    Michel Edmond Etienne and Fernand F. Nouvion

It is certified that error appears in the above-identified patent and that said Letters Patent are hereby corrected as shown below:

Column 1, line 69, change "kHz" to -- KHZ --.

Column 2, line 74, change "20" to -- 30 --.

Signed and sealed this 7th day of September 1971.

(SEAL)
Attest:

EDWARD M. FLETCHER, JR.           ROBERT GOTTSCHALK
Attesting Officer                 Acting Commissioner of Patents